United States Patent
Jung et al.

(10) Patent No.: US 10,872,710 B2
(45) Date of Patent: Dec. 22, 2020

(54) DIELECTRIC COMPOSITES, AND MULTI-LAYERED CAPACITORS AND ELECTRONIC DEVICES COMPRISING THEREOF

(71) Applicant: SAMSUNG ELECTRONICS CO., LTD., Suwon-si (KR)

(72) Inventors: Doh Won Jung, Seoul (KR); Chan Kwak, Yongin-si (KR); Hyungjun Kim, Suwon-si (KR); Jong Wook Roh, Anyang-si (KR); Daejin Yang, Yeongju-si (KR); Youngjin Cho, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

(21) Appl. No.: 16/426,044

(22) Filed: May 30, 2019

(65) Prior Publication Data
US 2019/0371487 A1    Dec. 5, 2019

(30) Foreign Application Priority Data
May 30, 2018    (KR) .................. 10-2018-0062098

(51) Int. Cl.
*H01B 3/12*    (2006.01)
*H01B 3/00*    (2006.01)
(Continued)

(52) U.S. Cl.
CPC .............. *H01B 3/002* (2013.01); *H01B 3/12* (2013.01); *H01G 4/1236* (2013.01);
(Continued)

(58) Field of Classification Search
CPC ........ H01B 3/002; H01B 3/12; H01G 4/1236; H01G 4/1263; H01G 4/1254; H01G 4/30
See application file for complete search history.

(56) References Cited

U.S. PATENT DOCUMENTS 4,244,722 A * 1/1981 Tsuya ................. C03B 17/06
                                                    264/211
6,528,445 B1    3/2003 Hong
(Continued)

FOREIGN PATENT DOCUMENTS

| JP | 2002198247 A | 7/2002 |
|----|---|---|
| JP | 2005187240 A | 7/2005 |

(Continued)

OTHER PUBLICATIONS

Hardy et al., "Strontium niobate high-k dielectrics: Film deposiiotn and material properties", Acta Materialia 58, 2010, 216-225.
(Continued)

*Primary Examiner* — Noah S Wiese
(74) *Attorney, Agent, or Firm* — Cantor Colburn LLP

(57) ABSTRACT

A dielectric composite includes: at least one first dielectric material represented by Chemical Formula 1, and at least one second dielectric material represented by Chemical Formula 2, wherein the first dielectric material has at least one first crystal structure and the second dielectric material has a second crystal structure that is different from the first crystal structure, and the first dielectric material and the second dielectric material are agglomerated with each other, $$A^{11}_{1-x}A^{12}_{x}B^{1}_{2}O_{6}$$    Chemical Formula 1

$$A^{21}_{2(1-y)}A^{22}_{2y}B^{2}_{2}O_{7}.$$    Chemical Formula 2

16 Claims, 6 Drawing Sheets

(51) Int. Cl.
*H01G 4/12* (2006.01)
*H01G 4/30* (2006.01)

(52) U.S. Cl.
CPC ......... *H01G 4/1254* (2013.01); *H01G 4/1263* (2013.01); *H01G 4/30* (2013.01)

(56) References Cited

U.S. PATENT DOCUMENTS

| | | | |
|---|---|---|---|
| 6,541,279 B2 * | 4/2003 | Hayashi | H01L 21/31691 438/3 |
| 8,610,269 B2 | 12/2013 | Nanba | |
| 8,906,818 B2 * | 12/2014 | Randall | C01G 49/009 501/138 |
| 2003/0158031 A1 * | 8/2003 | Isuhak | C01G 33/006 501/134 |
| 2008/0107885 A1 | 5/2008 | Alpay et al. | |

FOREIGN PATENT DOCUMENTS

| | | |
|---|---|---|
| JP | 2011009363 A | 1/2011 |
| KR | 20020038329 A | 5/2002 |

OTHER PUBLICATIONS

Zhipeng Gao et al., "Perovskite-Like Layered Structure A2B2O7 Ferroelectrics and Solid Solutions", A thesis submitted for the degree of Doctor of Philosophy, Queen Mary University of London, 2012, pp. 1-183.

* cited by examiner

DIELECTRIC COMPOSITES, AND MULTI-LAYERED CAPACITORS AND ELECTRONIC DEVICES COMPRISING THEREOF

CROSS-REFERENCE TO RELATED APPLICATION

This application claims priority to and the benefit of Korean Patent Application No. 10-2018-0062098, filed in the Korean Intellectual Property Office on May 30, 2018, and all the benefits therefrom under 35 U.S.C. § 119, the entire content of which is incorporated herein by reference.

BACKGROUND

1. Field

A dielectric composite and a multi-layered capacitor and an electronic device including the same are disclosed.

2. Description of the Related Art

A multi-layer ceramic condenser (MLCC) is a condenser having a large capacity and is an electronic device obtained by alternately laminating a dielectric ceramic composition and an internal electrode and firing the same simultaneously. However, desired is a condenser having a smaller size and thinner thickness, and greater capacity than available multi-layered ceramic condenser structures.

A capacity of the dielectric tends to be proportional to the relative permittivity and to be inversely proportional to a thickness, so it has been discussed to reduce a thickness of the dielectric layer included in the multi-layer ceramic condenser as thin as possible. However, using available materials, reductions in the thickness are limited.

SUMMARY

An embodiment provides a dielectric composite having improved relative permittivity and resistivity and a reduced dielectric loss, and improved reliability, even at a temperature above room temperature.

Another embodiment provides a multi-layered capacitor and an electronic device including the dielectric composite.

According to an embodiment, a dielectric composite includes at least one first dielectric material represented by Chemical Formula 1 and at least one second dielectric material represented by Chemical Formula 2, wherein the first dielectric material has at least one first crystal structure, the second dielectric material has a second crystal structure that is different from the first crystal structure, and the first dielectric material and the second dielectric material are agglomerated with each other, Chemical Formula 1

Chemical Formula 2 wherein in Chemical Formula 1 and Chemical Formula 2, $A^{11}$, $A^{12}$, $A^{21}$ and $A^{22}$ are each independently at least one metal element having an oxidation number of 2+, $A^{12}$ has an ionic radius which is larger than an ionic radius of $A^{11}$, $A^{22}$ has an ionic radius which is larger than an ionic radius of $A^{21}$, $B^1$ and $B^2$ are each independently at least one of Nb, Ta, V, Zr, W, Mo, and Cr, $0 \leq x \leq 0.5$, and $0 \leq y \leq 0.5$.

The first crystal structure may be at least one of a monoclinic crystal structure and a tetragonal crystal structure.

The second crystal structure may be at least one of an orthorhombic crystal structure and a tetragonal crystal structure.

The dielectric composite may include at least two different crystal structures.

The dielectric composite may include at least three different crystal structures.

Based on total moles of the dielectric composite, a mole ratio of the first dielectric material relative to the second dielectric material may be about 0.5 to about 2.

The metal elements having an oxidation number of 2+ may include Mg, Ca, Sr, Ba, or Ra.

The dielectric composite may exhibit a relative permittivity of about 20 to about 1500 at a thickness of about 2 nanometers (nm) to about 500 nm.

The first dielectric material may include a dielectric material A and a dielectric material B having different crystal structures.

Chemical Formula 1 may satisfy $0.2 \leq x \leq 0.5$.

Based on total moles of the dielectric composite, the dielectric material B may be included in an amount of about 0 mole percent (mol %) to about 30 mol %.

A multi-layered capacitor includes alternate layers of an internal electrode and a dielectric layer, wherein the dielectric layer includes the dielectric composite.

The internal electrode and the dielectric layer may be alternately laminated at least twice.

A thickness of the dielectric layer may be about 2 nm to about 500 nm.

An electronic device including the dielectric composite is provided.

The electronic device may be a varistor, a thermistor, or a capacitor for energy storage.

The dielectric composite may have improved relative permittivity and resistivity and a reduced dielectric loss and may exhibit improved reliability, even in a relatively high temperature environment compared with room temperature.

In addition, a multi-layered capacitor and an electronic device including the aforementioned dielectric composite may exhibit improved dielectric characteristics.

DETAILED DESCRIPTION

Advantages and characteristics of this disclosure, and a method for achieving the same, will become evident referring to the following embodiments together with the drawings attached hereto. However, the embodiments should not be construed as being limited to the embodiments set forth herein.

Unless otherwise defined, all terms used in the specification (including technical and scientific terms) may be used with meanings commonly understood by a person having ordinary knowledge in the art. The terms defined in a commercially available dictionary may not be interpreted ideally or exaggeratedly unless clearly defined. In addition, unless explicitly described to the contrary, the word "comprise" and variations such as "comprises" or "comprising," will be understood to imply the inclusion of stated elements but not the exclusion of any other elements.

Further, the singular includes the plural unless mentioned otherwise.

In the drawings, the thickness of layers, films, panels, regions, etc., are exaggerated for clarity. Like reference numerals designate like elements throughout the specification.

It will be understood that when a first element such as a layer, film, region, or substrate is referred to as being "on" a second element, it can be directly on the other element or intervening elements may also be present. In contrast, when an element is referred to as being "directly on" another element, there are no intervening elements present.

As used herein, the relative permittivity means a ratio of a dielectric constant of a material relative to a dielectric constant of a vacuum. The dielectric constant of the vacuum is a constant of about $8.854 \times 10^{-12}$ F/m.

As used herein, "a particle diameter" means a maximum size that a particle can have. For example, if a particle has an elongated shape such as an oval or similar sheet or a plate shape, it means a length of a major axis, if it has a circular or spherical shape, it means a diameter length, and if it has a polygon or amorphous shape, it means the longest straight line connecting any two points of the particle boundaries.

In addition, as used herein, for a particle diameter of a particle, although the particle diameter may be quantified by a measurement to show an average size of a group, the method of particle size analysis includes a mode diameter showing the maximum value of the distribution, a median diameter corresponding to the center value of integral distribution curve, a variety of average diameters (numeral average, length average, area average, mass average, volume average, etc.), and the like. Unless particularly mentioned otherwise, average particle diameters means to numeral average diameters in the present disclosure, and it is obtained by measuring D50 (particle diameters at a position of distribution rate of 50%).

Hereinafter, a dielectric composite according to an embodiment will be described with reference to FIGS. 1 to 3.

Figure 1:
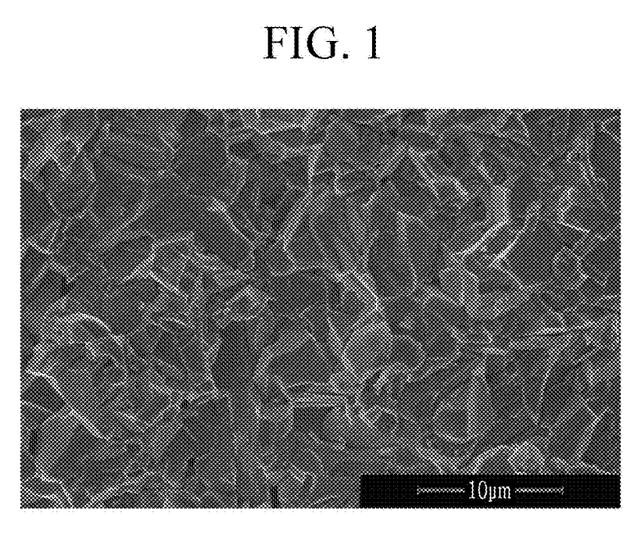
FIG. 1 is a scanning electron microscope (SEM) image showing a microstructure of a dielectric composite according to an embodiment.

FIG. 1 is a scanning electron microscope (SEM) image showing a microstructure of a dielectric composite according to an embodiment.

The dielectric composite according to an embodiment has a structure in which different dielectric materials are agglomerated to provide a composite structure. The dielectric composite includes at least one first dielectric material and at least one second dielectric material which are agglomerated with each other to form a dielectric composite as shown in FIG. 1.

For example, the dielectric composite according to an embodiment may be composed of at least two first dielectric materials and/or at least two second dielectric materials which are agglomerated with each other to provide a composite.

The dielectric composite according to an embodiment can exhibit improved relative permittivity and dielectric loss compared to a material comprising the first dielectric material or the second dielectric material alone. This will be described further through the examples.

When the first and second dielectric materials are used alone, the performance of the dielectric material may be largely deteriorated if a specific temperature condition is not satisfied due to the Curie temperature inherent to each material. For example, a barium titanate dielectric material exhibits a relatively improved relative permittivity as a ferroelectric material, but has a Curie temperature of about 100° C. to about 120° C. Therefore, the barium titanate-based dielectric material is difficult to use in an environment where a relatively high temperature is present, such as in electric components for vehicles.

The disclosed dielectric composite is a dielectric composite in which the first and second dielectric materials are different. Therefore, even if the first and second dielectric materials have different Curie temperatures, the Curie temperature of the dielectric composite may be controlled to be greater than the lower Curie temperature of the two dielectric materials.

The Curie temperature of a dielectric composite may be selected by use of specific types of the first and second dielectric materials, or the mole fractions of each of the first and second dielectric materials in the dielectric composite.

That is, for example, when a $SrNb_2O_6$-based dielectric material having a Curie temperature of about 25° C. is used as the first dielectric material and a $Sr_2Nb_2O_7$-based dielectric material having a Curie temperature of about 1327° C. is used as the second dielectric material, a dielectric composite thereof may be different according to the types of the first and second dielectric materials, their mole ratios, and their configuration, and may be selected to have a Curie temperature of at least about 80° C. to about 200° C.

In this way, when such a dielectric composite according to an embodiment is used, the Curie temperature of the dielectric composite may be more readily selected, and the dielectric composite has improved relative permittivity and reduced dielectric loss. Therefore, the dielectric composite according to an embodiment may minimize a decrease of relatively permittivity and/or an increase of dielectric loss in an environment of a relatively high temperature (e.g., about 20° C. to about 200° C., greater than or equal to about 80° C., for example greater than or equal to about 100° C., greater than or equal to about 150° C., or about 80° C. to about 200° C.) relative to room temperature, e.g., about 20° C. That is, in an embodiment, a dielectric composite having improved reliability at a high temperature may be provided.

The at least one first dielectric material according to an embodiment may be represented by Chemical Formula 1, and the at least one second dielectric materials may be represented by Chemical Formula 2.

Chemical Formulae 1 and 2 are independently as follows.

$$A^{11}_{1-x}A^{12}_{x}B^{1}_{2}O_6 \quad \text{Chemical Formula 1}$$

$$A^{21}_{2(1-y)}A^{22}_{2y}B^{2}_{2}O_7 \quad \text{Chemical Formula 2}$$

In Chemical Formula 1 and Chemical Formula 2, $A^{11}$, $A^{12}$, $A^{21}$, and $A^{22}$ are each independently at least one of a metal element having an oxidation number of 2+, $A^{12}$ has an ionic radius which is larger than an ionic radius of $A^{11}$, $A^{22}$ has an ion radius which is larger than an ionic radius of $A^{21}$, $B^1$ and $B^2$ are each independently at least one of Nb, Ta, V, Zr, W, Mo, and Cr, $0 \leq x \leq 0.5$, and $0 \leq y \leq 0.5$.

That is, the first dielectric material and the second dielectric material may be substituted with $A^{12}$ and $A^{22}$ at the position of the A element, respectively. However, other configurations are considered, and $A^{12}$ and/or $A^{22}$ may not be present, e.g., when x and/or y are 0 in Chemical Formula 1 and Chemical Formula 2.

In an embodiment, the metal elements at the A positions ($A^{11}$, $A^{12}$, $A^{21}$ and $A^{22}$) of Chemical Formula 1 and Chemical Formula 2 may include an alkaline-earth metal. For example, the metal element may include Mg, Ca, Sr, Ba, or Ra.

The at least one first dielectric material according to an embodiment may have at least one first crystal structure. In an embodiment, the first crystal structure may be at least one of a monoclinic crystal structure and a tetragonal crystal structure.

In an embodiment, the same types of first dielectric materials may have the same first crystal structure. Also, different types of first dielectric materials (e.g., when x in Chemical Formula 1 is different) may have a different first crystal structure. However, other configurations are considered, and even if they are different types of first dielectric materials, they may have the same first crystal structure.

Also, at least one second dielectric material according to an embodiment may have at least one second crystal structure. In an embodiment, the second crystal structure may be at least one of an orthorhombic crystal structure and a tetragonal crystal structure.

In an embodiment, the same type of the second dielectric material may have the same second crystal structure, and even if they are different types of the second dielectric materials (e.g., y in Chemical Formula 2 is different), they may have the same second crystal structure.

When each of the first and second dielectric materials has the above-described crystal structures, the dielectric composite may have at least two different crystal structures. Also, if the first dielectric material has at least two first crystal structures, the dielectric composite may have at least three different crystal structures.

Thus, even if the first and second dielectric materials form a dielectric composite, the dielectric composite has at least two crystal structures that are distinguished from each other.

Figure 2:
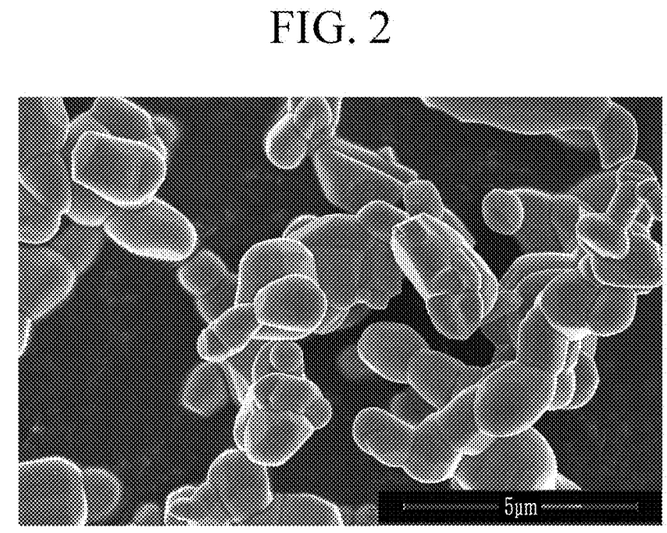
FIG. 2 shows a SEM image of a synthesized first dielectric material in a single phase.
Figure 3:
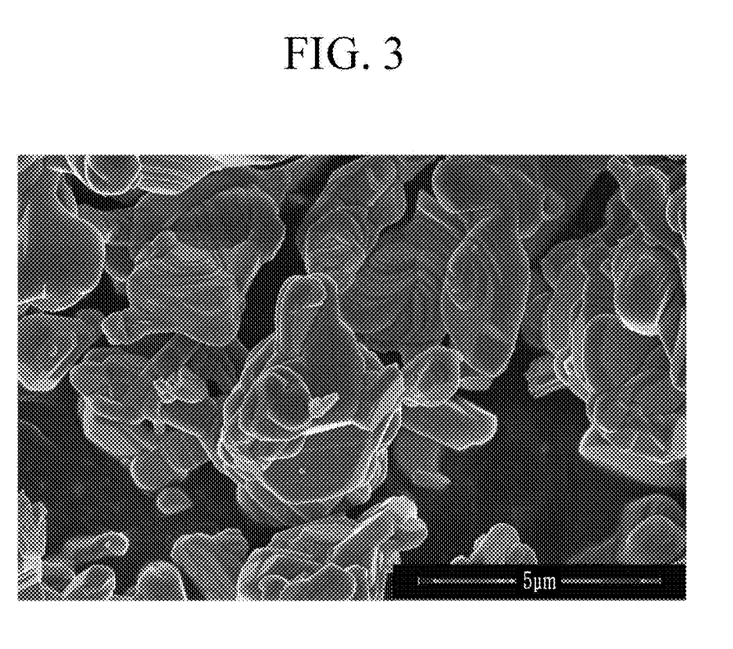
FIG. 3 shows a SEM image of a synthesized second dielectric material in a single phase.

FIG. 2 shows a SEM image of a synthesized first dielectric material in a single phase, and FIG. 3 shows a SEM image of a synthesized second dielectric material in a single phase.

For example, when the first and second dielectric materials are formed so as to have a single phase as shown in FIGS. 2 and 3, the first crystal structure has a relatively angular particle shape and the second crystal structure has a relatively flat plate-like particle shape.

Also, the dielectric composite according to an embodiment is shown in FIG. 1, which shows that the first particle shape of FIG. 2 and the second particle shape of FIG. 3 are mixed, and each particle is agglomerated and composited with each other. Even if the first and second dielectric materials are agglomerated and/or composited through sintering (e.g., heat treatment) according to an embodiment, intrinsic crystal structures of the first and second dielectric materials do not change in the dielectric composite and their intrinsic crystal structures may be maintained. As a result, the dielectric composite may have at least two different crystal structures.

In an embodiment, the first dielectric material may include at least two different dielectric materials (dielectric material A and dielectric material B). The dielectric material A and the dielectric material B may have a different crystal structure, respectively. For example, when the dielectric material A has a monoclinic crystal structure, the dielectric material B may have a tetragonal crystal structure and/or an orthorhombic crystal structure.

In an embodiment, each of the dielectric material A and the dielectric material B having a different crystal structure may be obtained by selecting a range of x in Chemical Formula 1 to $0.2 \leq x \leq 0.5$.

In an embodiment, the dielectric material B may be included less than the dielectric material A. That is, the dielectric material A may form a primary crystal structure of the first dielectric material, and the dielectric material B may be included in a trace amount which may form an auxiliary crystal structure.

In an embodiment, the dielectric material B may be for example greater than or equal to 0 mole percent (mol %), (dielectric material B may not be present), for example greater than or equal to about 10 mol %, greater than or equal to about 15 mol %, or greater than or equal to about 20 mol %, and for example less than or equal to about 50 mol %, or less than or equal to about 40 mol %, for example about 0 mol % to about 50 mol %, for example about 0 mol % to about 30 mol %, or about 10 mol % to about 30 mol % based on total moles of the dielectric composite. When the dielectric material B is included in the above ranges in the dielectric composite, it may contribute to the relative permittivity of the dielectric composite along with dielectric material A.

The ratio of the first and second dielectric materials in the dielectric composite may be varied in consideration of uses of the dielectric composite. For example, the mole ratios of the first and second dielectric materials may be variously selected in consideration of Curie temperature, relative permittivity, resistivity, and dielectric loss of each of the first and second dielectric materials.

Also, a mole ratio of the first dielectric material relative to the second dielectric material may be for example greater than or equal to about 0.25, greater than or equal to about 0.3, greater than or equal to about 0.4, or greater than or equal to about 0.5, and for example less than or equal to about 4, less than or equal to about 3, less than or equal to about 2, for example about 0.25 to about 4, for example about 0.5 to about 2, or about 1, based on a total moles of the dielectric composite according to an embodiment.

When the mole ratio of the first and second dielectric materials in the dielectric composite satisfies the above-described ranges, the dielectric composite may exhibit significantly improved dielectric constant and dielectric loss as compared with the dielectric properties of the first and second dielectric materials.

In an embodiment, the dielectric composite may have, for example, a thickness of less than about 1 micrometer, less than or equal to about 800 nm, less than or equal to about 600 nm, less than or equal to about 500 nm, less than or equal to about 400 nm, less than or equal to about 300 nm, or less than or equal to about 100 nm, and for example greater than or equal to about 2 nm, greater than or equal to about 10 nm, greater than or equal to about 20 nm, greater than or equal to about 40 nm, for example greater than or equal to about 2 nm and less than about 1 micrometer, for example about 2 nm to about 500 nm, or about 2 nm to about 100 nm.

The dielectric composite having the thickness within ranges may for example exhibit relative permittivity of greater than or equal to about 20, greater than or equal to about 100, or greater than or equal to about 200 and for example less than or equal to about 1500, or less than or equal to about 1000, for example about 20 to about 1500, about 100 to about 1500, or about 200 to about 1500.

When the dielectric composite has a thickness as described above, it may have a thickness that is less than a thickness of an available dielectric layer, while exhibiting dielectric characteristics at a desired level for the dielectric, as described above.

Accordingly, when the dielectric composite according to an embodiment is used, a multi-layered capacitor and an electronic device including the same may be miniaturized, thinned, and provide increased capacity.

As described above, the dielectric composite according to an embodiment may exhibit a dielectric constant greater than a certain level even if the thickness is reduced to the nanometer level. Curie temperatures and dielectric characteristics of the dielectric composite may be controlled by adjusting a mole ratio of the first and second dielectric materials in detail. Therefore, when the dielectric composite according to an embodiment is used, the laminated capacitor and the electronic device including the dielectric composite may be miniaturized, thinned, and have increased capacity, and may be easily applied to various fields which would benefit from a material suitable for a relatively high temperature environment relative to room temperature.

Hereinafter, referring to FIG. 4, an embodiment of a multi-layered capacitor including a dielectric composite is described.

Figure 4:
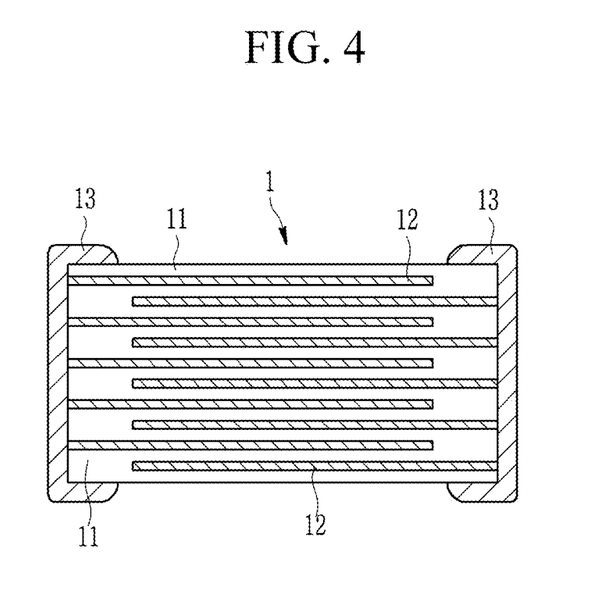
FIG. 4 schematically illustrates a multi-layered capacitor according to an embodiment.

FIG. 4 schematically illustrates a multi-layered capacitor according to an embodiment.

An embodiment of a multi-layered capacitor 1 basically has a structure in which an internal electrode 12 and a dielectric layer 11 are alternately laminated, and a dielectric layer 11 includes the dielectric composite.

In the multi-layered capacitor 1 according to an embodiment, the internal electrode 12 and the dielectric layer 11 may be alternately laminated two or more times, as shown in FIG. 4. Accordingly, the neighboring internal electrodes and the dielectric layer disposed therebetween may function as a single unit capacitor.

In the case of the multi-layered capacitor 1 according to an embodiment, the internal electrode 12 and the dielectric layer 11 may be alternately laminated at least twice, for example, at least three times, at least four times, or at least five times so that the multi-layered capacitor 1 may exhibit a capacitance due to a parallel arrangement structure of the internal unit capacitors therein.

The internal electrode 12 may be formed to have an area smaller than the area of the dielectric layer 11. Also, the internal electrodes 12 have the same area, and neighboring internal electrodes are not completely covered with each other, and may be laminated in an interwoven, intermeshed, or zig-zag pattern as shown in FIG. 4.

The dielectric layer 11 may be formed to have an area larger than the area of the internal electrode 12, and neighboring dielectric layers may be connected to each other to form a serpentine shape in cross section as shown in FIG. 4.

On the other hand, according to an embodiment, the multi-layered capacitor 1 may further include a pair of external electrodes 13 surrounding both sides of the laminate structure formed by the dielectric layer 11 and the internal electrode 12 as shown in FIG. 4. However, an embodiment is not limited thereto, but it is also possible to omit the external electrodes, and to extend the internal electrodes to both sides of the laminate structure formed by the dielectric layer and the internal electrode or to connect a power supply to the internal electrode immediately without the external electrode.

A multi-layered capacitor includes a plurality of dielectric layers and internal electrodes, and a total thickness of the dielectric layers can limit down-sizing and thinning of the multi-layered capacitor. However, since the dielectric layer of a current multi-layered capacitor uses $BaTiO_3$ as a dielectric material, it is difficult to reduce the thickness to below a certain level and it is also difficult to use the $BaTiO_3$ device in a relatively high temperature environment relative to room temperature as described above.

Therefore, when the total thickness of a dielectric layer is reduced in a current multi-layered capacitor, a thickness of the dielectric layer has a limit of about 0.5 micrometers and reliability is very low in a temperature environment of about 80° C. to about 200° C.

However, in the multi-layered capacitor 1 according to an embodiment, since the dielectric layer 11 includes the dielectric composite, a thickness per one layer of the dielectric layer 11 may be reduced to a level of less than or equal to about 500 nm, less than or equal to about 400 nm, less than or equal to about 200 nm, less than or equal to about 100 nm, less than or equal to about 40 nm, or less than or equal to about 20 nm, for example about 2 nm to about 500 nm, or about 2 nm to about 100 nm.

Even if the thickness per one layer of the dielectric layer 11 is reduced to the range, it may exhibit a relative permittivity of greater than or equal to about 20, greater than or equal to about 100, or greater than or equal to about 200 per one layer of the dielectric layer 11, and for example less than or equal to about 1500, less than or equal to about 1000, for example about 20 to about 1500, about 100 to about 1500, or about 200 to about 1500.

That is, the multi-layered capacitor 1 according to an embodiment may further reduce the thickness per one layer of the dielectric layer 11 beyond the limit of the material composed of the conventional dielectric layer, and may control a Curie temperature of the dielectric layer 11 variously. Accordingly, the multi-layered capacitor 1 according to an embodiment is easily applicable to a capacitor of various technical fields having a temperature environment of about 80° C. to about 200° C., while having a greatly improved capacitance.

Also, according to another embodiment, an electronic device including the aforementioned dielectric composite may be provided. The electronic device may be composed of a single layer of the aforementioned dielectric composite, or may be composed of multiple layers like the above-described multi-layered capacitor 1. The electronic device according to an embodiment may be a device that performs a function of a type of variable resistor such as a varistor or a thermistor, or may be a capacitor for energy storage.

Hereinafter, specific example examples are presented. It should be understood, however, that the examples described below are for the purpose of illustrating or explaining the technical contents in further detail, and thus the scope of the present disclosure should not be limited thereto.

EXAMPLES

Example 1

(1) Synthesis of $Sr_{0.9}Ba_{0.1}Nb_2O_6$ Powder $Sr_{0.9}Ba_{0.1}Nb_2O_6$ is synthesized in a solid-phase synthesis method.

Specifically, $SrCO_3$, $BaCO_3$, and $Nb_2O_5$ are weighed to provide suitable amounts of Sr, Ba, and Nb for the stoichiometry of $Sr_{0.9}Ba_{0.1}Nb_2O_6$ and then, mixed for 24 hours in a ball milling method by adding ethanol and zirconia ball media thereto. Subsequently, the mixture is dried by using a hot plate, while stirred, the obtained powder is put in an alumina crucible and calcined at 1200° C. under an air atmosphere. After cooling down the crucible to room temperature, the powder is taken out therefrom and finely ground to synthesize pulverized $Sr_{0.9}Ba_{0.1}Nb_2O_6$ powder. The obtained $Sr_{0.9}Ba_{0.1}Nb_2O_6$ powder has a microstructure as shown in FIG. 2.

(2) Synthesis of $Sr_{1.8}Ba_{0.2}Nb_2O_7$ Powder A pulverized $Sr_{1.8}Ba_{0.2}Nb_2O_7$ powder is synthesized through the same synthesis method as used for the aforementioned $Sr_{0.9}Ba_{0.1}Nb_2O_6$ except that $SrCO_3$, $BaCO_3$, and $Nb_2O_5$ are weighed to satisfy a composition of $Sr_{1.8}Ba_{0.2}Nb_2O_7$ among Sr, Ba, and Nb. The obtained $Sr_{1.8}Ba_{0.2}Nb_2O_7$ powder has a microstructure as shown in FIG. 3.

(3) Manufacture of Dielectric Composite

The $Sr_{0.9}Ba_{0.1}Nb_2O_6$ powder and the $Sr_{1.8}Ba_{0.2}Nb_2O_7$ powder are mixed in a mole ratio of 2:1, put in a die having a diameter of 10 mm, and then, molded into a pellet under 250 MPa for 3 minutes in a cold isostatic pressing method.

Subsequently, the pellet is sintered at 1400° C. for 2 hours under an air atmosphere to manufacture a dielectric composite according to Example 1.

The dielectric composite of Example 1 has a microstructure shown in FIG. 1.

Example 2

A dielectric composite according to Example 2 is manufactured according to the same method as Example 1 except that the $Sr_{0.9}Ba_{0.1}Nb_2O_6$ powder and the $Sr_{1.8}Ba_{0.2}Nb_2O_7$ powder are mixed in a mole ratio of 1:1.

Example 3

A dielectric composite according to Example 3 is manufactured according to the same method as Example 1 except that the $Sr_{0.9}Ba_{0.1}Nb_2O_6$ powder and the $Sr_{1.8}Ba_{0.2}Nb_2O_7$ powder are mixed in a mole ratio of 1:2.

Example 4

A $Sr_{0.8}Ba_{0.2}Nb_2O_6$ powder instead of the $Sr_{0.9}Ba_{0.1}Nb_2O_6$ powder and a $Sr_{1.6}Ba_{0.4}Nb_2O_7$ powder instead of the $Sr_{1.8}Ba_{0.2}Nb_2O_7$ powder are respectively prepared.

Subsequently, a dielectric composite according to Example 4 is manufactured according to the same method as Example 1 except that the $Sr_{0.8}Ba_{0.2}Nb_2O_6$ powder and the $Sr_{1.6}Ba_{0.4}Nb_2O_7$ powder are mixed in a mole ratio of 2:1.

Example 5

A dielectric composite according to Example 5 is manufactured according to the same method as Example 1 except that the $Sr_{0.8}Ba_{0.2}Nb_2O_6$ powder and the $Sr_{1.6}Ba_{0.4}Nb_2O_7$ powder are mixed in a mole ratio of 1:1.

Example 6

A dielectric composite according to Example 6 is manufactured according to the same method as Example 1 except that the $Sr_{0.8}Ba_{0.2}Nb_2O_6$ powder and the $Sr_{1.6}Ba_{0.4}Nb_2O_7$ powder are mixed in a mole ratio of 1:2.

Example 7

$Sr_{0.7}Ba_{0.3}Nb_2O_6$ powder instead of the $Sr_{0.9}Ba_{0.1}Nb_2O_6$ powder and $Sr_{1.4}Ba_{0.6}Nb_2O_7$ powder instead of the $Sr_{1.8}Ba_{0.2}Nb_2O_7$ powder are respectively prepared.

Subsequently, a dielectric composite according to Example 7 is manufactured according to the same method as Example 1 except that the $Sr_{0.7}Ba_{0.3}Nb_2O_6$ powder and the $Sr_{1.4}Ba_{0.6}Nb_2O_7$ powder are mixed in a mole ratio of 2:1.

Example 8

A dielectric composite according to Example 8 is manufactured according to the same method as Example 1 except that the $Sr_{0.7}Ba_{0.3}Nb_2O_6$ powder and the $Sr_{1.4}Ba_{0.6}Nb_2O_7$ powder are mixed in a mole ratio of 1:1.

Example 9

A dielectric composite according to Example 9 is manufactured according to the same method as Example 1 except that the $Sr_{0.7}Ba_{0.3}Nb_2O_6$ powder and the $Sr_{1.4}Ba_{0.6}Nb_2O_7$ powder are mixed in a mole ratio of 1:2.

Example 10

(1) Synthesis of $SrNb_2O_6$ Powder $SrNb_2O_6$ is synthesized in a solid-phase synthesis method.

Specifically, $SrCO_3$ and $Nb_2O_5$ are weighed to satisfy the above composition among Sr, and Nb and then, mixed for 24 hours in a ball milling method by adding ethanol and zirconia ball media thereto. Subsequently, the mixture is dried by using a hot plate, while stirred, and then, the obtained powder is put in an alumina crucible and calcined at 1200° C. under an air atmosphere. After cooling down the crucible to room temperature, the calcined powder is taken out therefrom and finely ground to synthesize pulverized $SrNb_2O_6$ powder.

(2) Synthesis of $Sr_2Nb_2O_7$ Powder

A pulverized $Sr_2Nb_2O_7$ powder is synthesized through the same process as used for the aforementioned $SrNb_2O_6$ except that $SrCO_3$ and $Nb_2O_5$ are weighed to satisfy a composition of $Sr_2Nb_2O_7$ between Sr and Nb.

(3) Manufacture of Dielectric Composite

The $SrNb_2O_6$ powder and the $Sr_2Nb_2O_7$ powder are mixed in a mole ratio of 2:1, put in a die having a diameter of 10 mm, and then, molded into a pellet under 250 MPa for 3 minutes in a cold isostatic pressing method.

Subsequently, the molded pellet is reduced at 1250° C. for 2 hours under a dry 1% $H_2/N_2$ ($N_2$ 1 L, $H_2$ 10 cc) atmosphere and reoxidized again at 900° C. for 2 hours under an air atmosphere to prepare a dielectric composite according to Example 10.

Example 11

A dielectric composite according to Example 11 is manufactured according to the same method as Example 10 except that the $SrNb_2O_6$ powder and the $Sr_2Nb_2O_7$ powder are mixed in a mole ratio of 1:1.

Example 12

A dielectric composite according to Example 12 is manufactured according to the same method as Example 10 except that the $SrNb_2O_6$ powder and the $Sr_2Nb_2O_7$ powder are mixed in a mole ratio of 1:2.

Example 13

(1) Synthesis of $Sr_{0.9}Ba_{0.1}Nb_2O_6$ Powder $Sr_{0.9}Ba_{0.1}Nb_2O_6$ is synthesized in a solid-phase synthesis method.

Specifically, $SrCO_3$, $BaCO_3$, and $Nb_2O_5$ are weighed to satisfy the above composition among Sr, Ba, and Nb and then, mixed for 24 hours in a ball milling method by adding ethanol and zirconia ball media thereto. Subsequently, the mixture is dried by using a hot plate, while stirred, and then, put in an alumina crucible and calcined at 1200° C. under an air atmosphere. After cooling down the crucible to room temperature, the calcined powder is taken out therefrom and finely ground to synthesize pulverized $Sr_{0.9}Ba_{0.1}Nb_2O_6$ powder.

(2) Synthesis of $Sr_{1.8}Ba_{0.2}Nb_2O_7$ Powder

A pulverized $Sr_{1.8}Ba_{0.2}Nb_2O_7$ powder is synthesized through the same method as used for the above $Sr_{0.9}Ba_{0.1}Nb_2O_6$ except that $SrCO_3$, $BaCO_3$, and $Nb_2O_5$ are weighed to satisfy a composition of $Sr_{1.8}Ba_{0.2}Nb_2O_7$ among Sr, Ba, and Nb.

(3) Manufacture of Dielectric Composite

The $Sr_{0.9}Ba_{0.1}Nb_2O_6$ powder and the $Sr_{1.8}Ba_{0.2}Nb_2O_7$ powder are mixed in a mole ratio of 2:1 and then, put in a die having a diameter of 10 mm and molded into a pellet under 250 MPa for 3 minutes in a cold isostatic pressing method.

Subsequently, the molded pellet is reduced under a dry 1% $H_2/N_2$ ($N_2$ 1 L, $H_2$ 10 cc) atmosphere at 1250° C. for 2 hours and then, reoxidized again under an air atmosphere at 900° C. for 2 hours to manufacture a dielectric composite according to Example 13.

Example 14

A dielectric composite according to Example 14 is manufactured according to the same process as used for Example 13 except that the $Sr_{0.9}Ba_{0.1}Nb_2O_6$ powder and the $Sr_{1.8}Ba_{0.2}Nb_2O_7$ powder are mixed in a mole ratio of 1:1.

Example 15

A dielectric composite according to Example 15 is manufactured according to the same process as used for Example 13 except that the $Sr_{0.9}Ba_{0.1}Nb_2O_6$ powder and the $Sr_{1.8}Ba_{0.2}Nb_2O_7$ powder are mixed in a mole ratio of 1:2.

Comparative Example 1

A pulverized $SrNb_2O_6$ powder is obtained according to the same method as Example 1 except that $SrCO_3$ and $Nb_2O_5$ are weighed to satisfy a composition of $SrNb_2O_6$ between Sr and Nb.

The obtained $SrNb_2O_6$ powder is put in a die having a diameter of 10 mm and then, molded into a pellet under 250 MPa for 3 minutes in a cold isostatic pressing method.

Subsequently, the molded pellet is sintered at 1400° C. for 2 hours under an air atmosphere to manufacture a dielectric composite according to Comparative Example 1.

Comparative Example 2

A pulverized $Sr_2Nb_2O_7$ powder is obtained according to the same method as Example 1 except that $SrCO_3$ and $Nb_2O_5$ are weighed to satisfy a composition of $Sr_2Nb_2O_7$ between Sr and Nb.

The obtained $Sr_2Nb_2O_7$ powder is put in a die having a diameter of 10 mm and then, molded into a pellet under 250 MPa for 3 minutes by using a cold isostatic pressing method.

Subsequently, the molded pellet is sintered at 1400° C. for 2 hours under an air atmosphere to manufacture a dielectric composite according to Comparative Example 2.

Comparative Example 3

The $Sr_{0.9}Ba_{0.1}Nb_2O_6$ powder obtained during the manufacturing process of Example 1 is put in a die having a diameter of 10 mm and then, molded into a pellet under 250 MPa for 3 minutes in a cold isostatic pressing method.

Subsequently, the molded pellet is sintered at 1400° C. for 2 hours under an air atmosphere to manufacture a dielectric composite according to Comparative Example 3.

Comparative Example 4

A dielectric composite according to Comparative Example 4 is manufactured according to the same process as used in Comparative Example 3 by using $Sr_{1.8}Ba_{0.2}Nb_2O_7$ powder instead of the $Sr_{0.9}Ba_{0.1}Nb_2O_6$ powder.

Comparative Example 5

A dielectric composite according to Comparative Example 5 is manufactured according to the same process as used in Comparative Example 3 by using $Sr_{0.8}Ba_{0.2}Nb_2O_6$ powder instead of the $Sr_{0.9}Ba_{0.1}Nb_2O_6$ powder.

Comparative Example 6

A dielectric composite according to Comparative Example 6 is manufactured according to the same process as used in Comparative Example 3 by using $Sr_{1.6}Ba_{0.4}Nb_2O_7$ powder instead of the $Sr_{0.9}Ba_{0.1}Nb_2O_6$ powder.

Comparative Example 7

A dielectric composite according to Comparative Example 7 is manufactured according to the same process as used in Comparative Example 3 by using $Sr_{0.7}Ba_{0.3}Nb_2O_6$ powder instead of the $Sr_{0.9}Ba_{0.1}Nb_2O_6$ powder.

Comparative Example 8

A dielectric composite according to Comparative Example 8 is manufactured according to the same process as used in Comparative Example 3 by using $Sr_{1.4}Ba_{0.6}Nb_2O_7$ powder instead of the $Sr_{0.9}Ba_{0.1}Nb_2O_6$ powder.

Comparative Example 9

The $SrNb_2O_6$ powder obtained during the manufacturing process of Example 10 is put in a die having a diameter of 10 mm and then, molded into a pellet under 250 MPa for 3 minutes in a cold isostatic pressing method.

Subsequently, the molded pellet is reduced at 1250° C. for 2 hours under a dry 1% $H_2/N_2$ ($N_2$ 1 L, $H_2$ 10 cc) atmosphere and then, reoxidized again at 900° C. for 2 hours under an air atmosphere to manufacture a dielectric composite according to Comparative Example 9.

Comparative Example 10

The $Sr_2Nb_2O_7$ powder obtained during the manufacturing process of Example 10 is put in a die having a diameter of 10 mm and then, molded into a pellet under 250 MPa for 3 minutes in a cold isostatic pressing method.

Subsequently, the molded pellet is reduced at 1250° C. for 2 hours under a dry 1% $H_2/N_2$ ($N_2$ 1 L, $H_2$ 10 cc) atmosphere and then, reoxidized again at 900° C. for 2 hours under an air atmosphere to manufacture a dielectric composite according to Comparative Example 10.

Comparative Example 11

The $Sr_{0.9}Ba_{0.1}Nb_2O_6$ powder obtained during the manufacturing process of Example 13 is put in a die having a diameter of 10 mm and then, molded into a pellet under 250 MPa for 3 minutes in a cold isostatic pressing method.

Subsequently, the molded pellet is reduced at 1250° C. for 2 hours under a dry 1% $H_2/N_2$ ($N_2$ 1 L, $H_2$ 10 cc) atmosphere and then, reoxidized again at 900° C. for 2 hours under an air atmosphere to manufacture a dielectric composite according to Comparative Example 11.

Comparative Example 12

A dielectric composite according to Comparative Example 12 is manufactured according to the same method as Comparative Example 11 except that $Sr_{1.8}Ba_{0.2}Nb_2O_7$ powder is used instead of the $Sr_{0.9}Ba_{0.1}Nb_2O_6$ powder.

Evaluation 1: Analysis of Crystal Structure of $Sr_{1-x}Ba_xNb_2O_6$ Powder

Crystal structures of the $Sr_{1-x}Ba_xNb_2O_6$ powders respectively obtainable in the dielectric composite manufacturing processes according to Comparative Example 1 (x=0), Example 1 (x=0.1), Example 4 (x=0.2), and Example 7 (x=0.3) are analyzed by using an X-ray diffraction analysis device.

Figure 5:
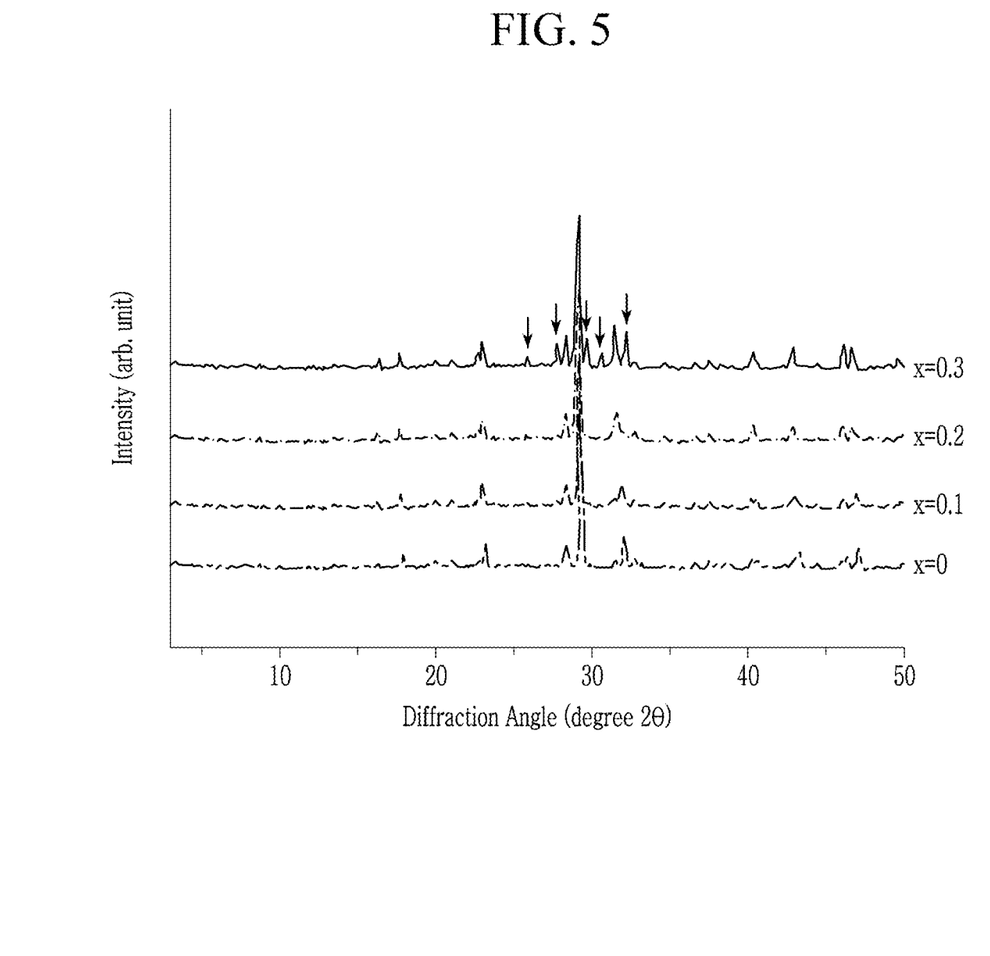
FIG. 5 is a graph of intensity (arbitrary units) versus diffraction angle (degrees two-theta) showing the results of X-ray diffraction analysis according to a change of a barium content of a $Sr_{1-x}Ba_xNb_2O_6$ powder.

FIG. 5 is a graph showing the results of X-ray diffraction analysis according to a barium content of a $Sr_{1-x}Ba_xNb_2O_6$ powder.

Referring to FIG. 5, a diffraction peak in one case of not including barium with a reference to a position A in Chemical Formula 1 is substantially equivalent to a diffraction peak in the other case of including barium in a mole ratio of x=0.1 or x=0.2. A crystal structure obtained from the diffraction peak is a monoclinic crystal structure of P21/c (14).

When barium is included in a mole ratio of x=0.3, a similar peak to the above diffraction peak is formed, and in addition, diffraction peaks marked by an arrow in FIG. 5 are further formed. The diffraction peaks marked by an arrow in FIG. 5 have a tetragonal crystal structure of P4bm (100).

Accordingly, two different kinds of crystal structures may be obtained by changing a content of barium in $Sr_{1-x}Ba_xNb_2O_6$ as an intermediate.

Evaluation 2: Analysis of Crystal Structures of Dielectric Composites According to Examples 1 to 3 and Comparative Examples 3 to 4

Crystal structures of the dielectric composite powders according to Examples 1 to 3 and Comparative Examples 3 to 4 are analyzed by X-ray diffraction.

Figure 6:
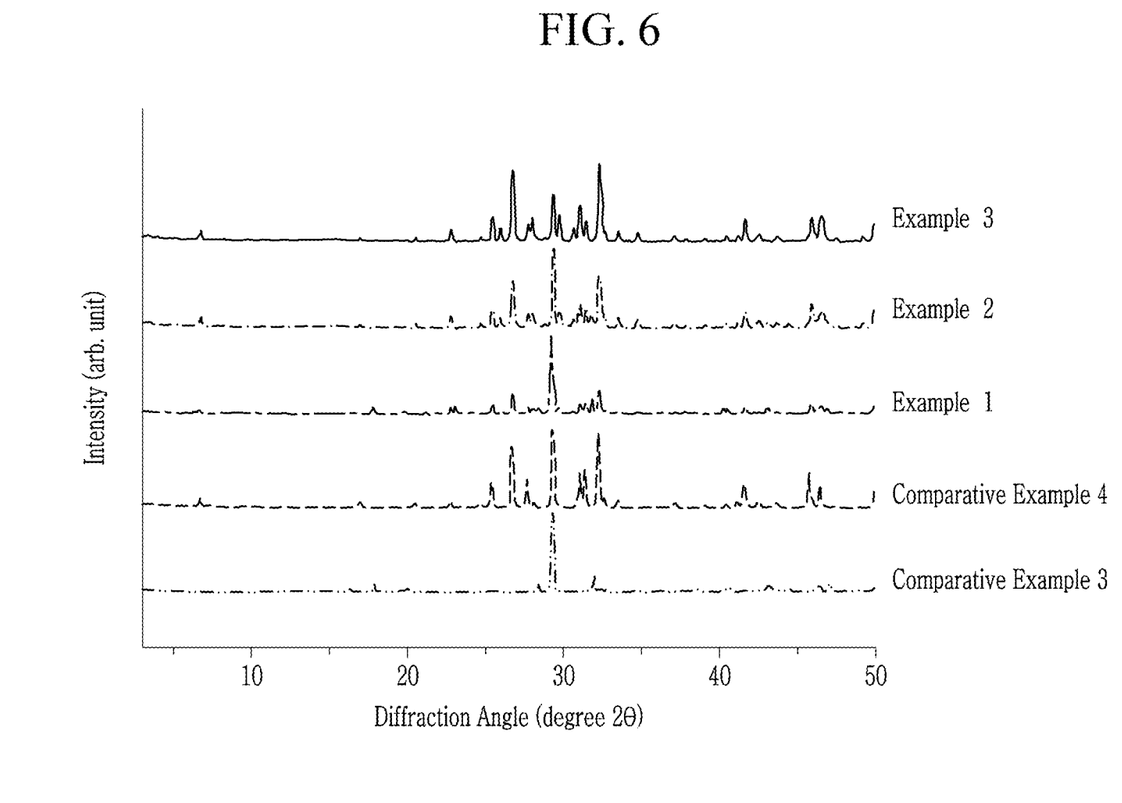
FIG. 6 is a graph of intensity (arbitrary units) versus diffraction angle (degrees two-theta) showing the results of X-ray diffraction analysis of the dielectric composites according to Example 1 to Example 3 and Comparative Example 3 to Comparative Example 4.

FIG. 6 is a graph showing the results of X-ray diffraction analysis of the dielectric composites according to Examples 1 to 3 and Comparative Examples 3 to 4.

First, the dielectric composites according to Comparative Examples 3 and 4 have a diffraction peak shown in FIG. 6. On the other hand, the dielectric composites according to Examples 1 to 3 show diffraction peak profiles combining the diffraction peaks of Comparative Examples 3 and 4.

Accordingly, the dielectric composites according to Examples 1 to 3 have both a first crystal structure derived from $Sr_{1-x}Ba_xNb_2O_6$ and a second crystal structure derived from $Sr_{2(1-y)}Ba_{2y}Nb_2O_7$. In addition, as an amount of $Sr_{2(1-y)}Ba_{2y}Nb_2O_7$ is gradually increased in order of Example 1, Example 2, and Example 3, intensities of diffraction peaks corresponding to $Sr_{2(1-y)}Ba_{2y}Nb_2O_7$ in Examples 1, 2, and 3 are gradually increased in the same order.

Evaluation 3: Analysis of Dielectric Characteristics of Dielectric Composites According to Examples 1 to 3 and Comparative Examples 1 to 4

Regarding the dielectric composites according to Examples 1 to 3 and Comparative Examples 1 to 4, relative permittivity at a frequency of 1 kHz, a dielectric loss at a frequency of 1 kHz, and resistivity when a voltage of 200 V is applied are respectively measured, and the results are shown in Table 1.

TABLE 1

|  | Relative permittivity (@ 1 kHz) | Dielectric loss (tan δ, @ 1 kHz) | Resistivity (ohm · cm, @ 200 V) |
| --- | --- | --- | --- |
| Example 1 | 56 | 0.07 | $3.0 \times 10^{10}$ |
| Example 2 | 87 | 0.07 | $1.1 \times 10^{11}$ |
| Example 3 | 161 | 0.01 | $6.0 \times 10^{11}$ |
| Comparative Example 1 | 26 | 0.05 | $1.3 \times 10^{11}$ |
| Comparative Example 2 | 44 | 0.11 | $4.7 \times 10^{10}$ |
| Comparative Example 3 | 28 | 0.03 | $7.8 \times 10^{10}$ |
| Comparative Example 4 | 45 | 0.09 | $2.2 \times 10^{10}$ |

Referring to Table 1, the dielectric composites according to Examples 1 to 3 show high relative permittivity and improved resistivity compared with those substituted with barium in the same mole ratio as examples according to Comparative Examples 3 and 4 as well as those unsubstituted with barium according to Comparative Examples 1 and 2.

Evaluation 4: Analysis of Dielectric Characteristics of Dielectric Composites According to Examples 4 to 6 and Comparative Examples 5 to 6

Relative permittivity, a dielectric loss, and resistivity of the dielectric composites according to Examples 4 to 6 and Comparative Examples 5 to 6 are respectively measured with the same reference as Evaluation 3, and the results are shown in Table 2.

TABLE 2

|  | Relative permittivity (@ 1 kHz) | Dielectric loss (tan δ, @ 1 kHz) | Resistivity (ohm · cm, @ 200 V) |
| --- | --- | --- | --- |
| Example 4 | 658 | 0.03 | $3.0 \times 10^{11}$ |
| Example 5 | 336 | 0.02 | $2.3 \times 10^{11}$ |
| Example 6 | 171 | 0.03 | $1.5 \times 10^{11}$ |
| Comparative Example 5 | 119 | 0.04 | $6.6 \times 10^{10}$ |
| Comparative Example 6 | 55 | 0.31 | $5.3 \times 10^{9}$ |

Referring to Table 2, the dielectric composites according to Examples 4 to 6 show improved relative permittivity and resistivity and a low dielectric loss compared with those substituted with barium in the same mole ratio as examples according to Comparative Examples 5 and 6. In addition, Examples 4 to 6 show at most 12 times improved relative permittivity and at most 57 times improved resistivity by adjusting a mole ratio between $Sr_{1-x}Ba_xNb_2O_6$ and $Sr_{2(1-y)}Ba_{2y}Nb_2O_7$ compared with Comparative Examples.

Evaluation 5: Analysis of Dielectric Characteristics of Dielectric Composites According to Examples 7 to 9 and Comparative Examples 7 to 8

Relative permittivity, a dielectric loss, and resistivity of the dielectric composites according to Examples 7 to 9 and Comparative Examples 7 to 8 are measured with the same reference as Evaluation 3, and the results are shown in Table 3.

TABLE 3

|  | Relative permittivity (@ 1 kHz) | Dielectric loss (tan δ, @ 1 kHz) | Resistivity (ohm · cm, @ 200 V) |
| --- | --- | --- | --- |
| Example 7 | 696 | 0.03 | $8.1 \times 10^{10}$ |
| Example 8 | 356 | 0.03 | $4.4 \times 10^{10}$ |
| Example 9 | 178 | 0.04 | $6.2 \times 10^{11}$ |
| Comparative Example 7 | 189 | 0.07 | $1.8 \times 10^{11}$ |
| Comparative Example 8 | 67 | 0.39 | $1.3 \times 10^{9}$ |

Referring to Table 3, the dielectric composites according to Examples 7 to 9 show improved resistivity and a low dielectric loss compared with those of Comparative Examples 7 and 8, even though barium is substituted in the same mole ratio as examples. In addition, Examples 7 to 9 show at most 10 times improved relative permittivity and at most 62 times improved resistivity compared with Comparative Examples by adjusting a mole ratio of $Sr_{1-x}Ba_xNb_2O_6$ and $Sr_{2(1-y)}Ba_{2y}Nb_2O_7$.

Also, referring to Tables 1 and 2 along with Table 3, as a mole ratio of barium in a dielectric composite is increased, relative permittivity gradually increases. Particularly, as for Examples 7 to 9 including barium in a mole ratio of 30 mol % based on the total moles, $SrNb_2O_6$ is formed as a main phase, and $Sr_{0.744}Ba_{0.247}Nb_2O_6$ is formed as an auxiliary phase. Accordingly, the mole ratio of barium in the dielectric composite contributes to improving relative permittivity of the dielectric composite.

Evaluation 6: Analysis of Dielectric Characteristics of Dielectric Composites According to Examples 10 to 12 and Comparative Examples 9 to 10

Relative permittivity, a dielectric loss, and resistivity of the dielectric composites according to Examples 10 to 12 and Comparative Examples 9 to 10 are measured with the same reference as Evaluation 3, and the results are shown in Table 4.

TABLE 4

|  | Relative permittivity (@ 1 kHz) | Dielectric loss (tan δ, @ 1 kHz) | Resistivity (ohm · cm, @ 200 V) |
| --- | --- | --- | --- |
| Example 10 | 74 | 0.76 | $2.7 \times 10^{9}$ |
| Example 11 | 73 | 0.98 | $2.4 \times 10^{9}$ |
| Example 12 | 64 | 0.88 | $1.0 \times 10^{9}$ |
| Comparative Example 9 | 17 | 0.2 | $1.0 \times 10^{10}$ |
| Comparative Example 10 | 41 | 0.59 | $2.3 \times 10^{9}$ |

Referring to Table 4, Examples 10 to 12 show greatly improved relative permittivity compared with Comparative Examples 9 and 10 when the dielectric composites include no barium. The results of Table 4 show that a dielectric composite including no barium shows improved relative permittivity.

Evaluation 7: Analysis of Dielectric Characteristics of Dielectric Composites According to Examples 13 to 15 and Comparative Examples 11 to 12

Relative permittivity, a dielectric loss, and resistivity of the dielectric composites according to Examples 13 to 15 and Comparative Examples 11 to 12 are measured with the same reference as Evaluation 3, and the results are shown in Table 5.

TABLE 5

|  | Relative permittivity (@ 1 kHz) | Dielectric loss (tan δ, @ 1 kHz) | Resistivity (ohm · cm, @ 200 V) |
| --- | --- | --- | --- |
| Example 13 | 225 | 0.26 | $2.4 \times 10^{9}$ |
| Example 14 | 164 | 0.31 | $2.0 \times 10^{9}$ |
| Example 15 | 102 | 0.37 | $2.0 \times 10^{9}$ |
| Comparative Example 11 | 32 | 0.33 | $9.1 \times 10^{9}$ |
| Comparative Example 12 | 38 | 0.56 | $3.0 \times 10^{9}$ |

Referring to Table 5, the dielectric composites according to Examples 13 to 15 show improved relative permittivity, dielectric loss, and resistivity like Examples 1 to 3, even though the heat treatment condition is changed from Examples 1 to 3, compared with the comparative examples.

While the present disclosure has been particularly shown and described with reference to exemplary embodiments thereof, it is to be understood that the present disclosure is not limited to the disclosed exemplary embodiments, but, on the contrary, is intended to cover various modifications and equivalent arrangements included within the spirit and scope of the present disclosure.

What is claimed is:

1. A dielectric composite, comprising:
   at least one first dielectric material represented by Chemical Formula 1, and
   at least one second dielectric material represented by Chemical Formula 2,
   wherein the first dielectric material has at least one first crystal structure and the second dielectric material has a second crystal structure that is different from the first crystal structure, and the first dielectric material and the second dielectric material are agglomerated with each other $$A^{11}_{1-x}A^{12}_{x}B^{1}_{2}O_{6} \quad \text{Chemical Formula 1}$$

$$A^{21}_{2(1-y)}A^{22}_{2y}B^{2}_{2}O_{7} \quad \text{Chemical Formula 2}$$

wherein, in Chemical Formula 1 and Chemical Formula 2,
$A^{11}$, $A^{12}$, $A^{21}$, and $A^{22}$ are each independently at least one metal element having an oxidation number of 2+,
$A^{12}$ has an ionic radius which is larger than an ionic radius of $A^{11}$,
$A^{22}$ has an ionic radius which is larger than an ionic radius of $A^{21}$,
$B^{1}$ and $B^{2}$ are each independently at least one of Nb, Ta, V, Zr, W, Mo, and Cr,
$0 \leq x \leq 0.5$, and $0 \leq y \leq 0.5$.

2. The dielectric composite of claim 1, wherein the first crystal structure is at least one of a monoclinic crystal structure and a tetragonal crystal structure.

3. The dielectric composite of claim 1, wherein the second crystal structure is at least one of an orthorhombic crystal structure and a tetragonal crystal structure.

4. The dielectric composite of claim 1, wherein the dielectric composite comprises at least two different crystal structures.

5. The dielectric composite of claim 1, wherein the dielectric composite comprises at least three crystal structures.

6. The dielectric composite of claim 1, wherein a mole ratio of the first dielectric material relative to the second dielectric material is about 0.5 to about 2, based on total moles of the dielectric composite.

7. The dielectric composite of claim 1, wherein the $A^{11}$, $A^{12}$, $A^{21}$, and $A^{22}$ are each independently at least one metal element having an oxidation number of 2+ comprising Mg, Ca, Sr, Ba, or Ra.

8. The dielectric composite of claim 1, wherein the dielectric composite has relative permittivity of about 20 to about 1500 at a thickness of about 2 nanometers to about 500 nanometers.

9. The dielectric composite of claim 1, wherein the first dielectric material comprises a dielectric material A and a dielectric material B, wherein a crystal structure of the dielectric material A and a crystal structure dielectric material B are different.

10. The dielectric composite of claim 1, wherein Chemical Formula 1 satisfies $0.2<x<0.5$.

11. The dielectric composite of claim 9, wherein the dielectric material B is included in an amount of about 0 mole percent to about 30 mole percent, based on total moles of the dielectric composite.

12. A multi-layered capacitor comprising:
alternate layers of an internal electrode and a dielectric layer,
wherein the dielectric layer comprises the dielectric composite of claim 1.

13. The multi-layered capacitor of claim 12, wherein the internal electrode and the dielectric layer alternate at least twice.

14. The multi-layered capacitor of claim 12, wherein a thickness of the dielectric layer is about 2 nanometers to about 500 nanometers.

15. An electronic device comprising the dielectric composite of claim 1.

16. The electronic device of claim 15, wherein the electronic device is a varistor, a thermistor, or a capacitor.

* * * * *